(12) United States Patent
Nebel

(10) Patent No.: US 9,592,783 B2
(45) Date of Patent: Mar. 14, 2017

(54) STEERING WHEEL UNIT

(71) Applicant: Autoliv Develpement AB, SE-447 Vargarda (SE)

(72) Inventor: Raimund Nebel, Obermeitingen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 124 days.

(21) Appl. No.: 14/356,697

(22) PCT Filed: Nov. 7, 2012

(86) PCT No.: PCT/US2012/004624
§ 371 (c)(1),
(2) Date: May 7, 2014

(87) PCT Pub. No.: WO2013/068101
PCT Pub. Date: May 16, 2013

(65) Prior Publication Data
US 2015/0336529 A1    Nov. 26, 2015

(30) Foreign Application Priority Data

Nov. 10, 2011   (DE) .................. 10 2011 118 090

(51) Int. Cl.
*B60R 21/203*   (2006.01)
*B60R 21/217*   (2011.01)

(52) U.S. Cl.
CPC ........ *B60R 21/2037* (2013.01); *B60R 21/217* (2013.01); *B60R 2021/2175* (2013.01)

(58) Field of Classification Search
CPC .............. B60R 21/2037; B60R 21/217; B60R 2021/2175
See application file for complete search history.

(56) References Cited

U.S. PATENT DOCUMENTS

| 1,844,409 A | 10/1928 | Rypinski |
| 5,087,069 A | 2/1992 | Corbett et al. |

(Continued)

FOREIGN PATENT DOCUMENTS

| DE | 197 25 684 C1 | 12/1998 |
| DE | 197 30 837 A1 | 1/1999 |

(Continued)

OTHER PUBLICATIONS

PCT International Search Report—Jan. 18, 2013.
German Examination Report—Jun. 28, 2012.

*Primary Examiner* — Darlene P Condra

(57) ABSTRACT

A steering wheel unit with a steering wheel body and an air bag module arranged on the steering wheel body and can be depressed on the steering wheel body in an axial direction. Positioning units position the air bag module on the steering wheel, including a first positioning unit (P1, P1', and P1"), a steering wheel side positioning element with at least one rigid level positioning surface (29a, 29a', 29a"), and an air bag module side positioning element with at least one rigid positioning mating surface (74a, 74a', 74a"). The positioning surface and the positioning mating surface are parallel to and abut one another when the air bag module is not depressed. The positioning surface (29a, 29a', and 29a") and the positioning mating surface (74a, 74a', and 74a") are angled toward one another with respect to a reference plane (BE) which is perpendicular to the axial direction.

18 Claims, 12 Drawing Sheets

(56) References Cited

U.S. PATENT DOCUMENTS

| | | |
|---|---|---|
| 5,228,362 A | 7/1993 | Chen et al. |
| 5,380,037 A | 1/1995 | Worrell et al. |
| 5,975,560 A | 11/1999 | Fischer |
| 6,029,992 A | 2/2000 | Vendely et al. |
| 6,092,832 A | 7/2000 | Worrell et al. |
| 6,186,484 B1 | 2/2001 | Noda et al. |
| 6,193,268 B1 | 2/2001 | Derrick |
| 6,213,502 B1 | 4/2001 | Ryan et al. |
| 6,382,662 B1 | 5/2002 | Igawa |
| 6,429,599 B1 | 8/2002 | Laue et al. |
| 6,554,312 B2 * | 4/2003 | Sakane ............... B60Q 5/003 280/728.2 |
| 7,118,124 B2 * | 10/2006 | Weis ................. B60R 21/2037 280/728.2 |
| 7,533,897 B1 * | 5/2009 | Xu ..................... B60Q 5/003 280/728.2 |
| 7,708,309 B2 | 5/2010 | Kim et al. |
| 7,823,908 B2 | 11/2010 | Matsu et al. |
| 8,042,830 B2 * | 10/2011 | Hagelgans ......... B60R 21/2035 280/728.2 |
| 8,087,691 B2 | 1/2012 | Nebel et al. |
| 2003/0019704 A1 | 1/2003 | Aoi et al. |
| 2004/0025624 A1 | 2/2004 | Kreuzer |
| 2004/0178901 A1 | 9/2004 | Ota et al. |
| 2004/0239080 A1 * | 12/2004 | Berrahou ............. B60R 21/203 280/728.2 |
| 2009/0085334 A1 | 4/2009 | Matsu et al. |
| 2009/0218739 A1 * | 9/2009 | Terada ............... B60R 21/2037 267/2 |
| 2009/0288272 A1 | 11/2009 | Zanella et al. |
| 2011/0089672 A1 | 4/2011 | Nebel et al. |
| 2014/0070520 A1 * | 3/2014 | James .................. B60R 21/20 280/728.2 |
| 2014/0145420 A1 * | 5/2014 | Amamori ........... B60R 21/2037 280/731 |
| 2014/0217711 A1 * | 8/2014 | Strecker ............. B60R 21/2037 280/731 |

FOREIGN PATENT DOCUMENTS

| | | |
|---|---|---|
| DE | 199 16 267 A1 | 10/2000 |
| DE | 10 2006 037 672 A1 | 2/2008 |
| EP | 0 830 990 B1 | 4/2003 |
| EP | 1 466 793 B1 | 7/2006 |
| EP | 2008/025641 A1 | 3/2008 |
| EP | 2 085 290 A1 | 8/2009 |
| EP | 2009/149776 A1 | 12/2009 |
| EP | 2 300 275 B1 | 1/2012 |
| GB | 2 426 316 A | 11/2006 |
| JP | 2002145075 A | 5/2002 |
| JP | 2002323087 A | 11/2002 |
| JP | 2003040112 A | 2/2003 |
| JP | 2006096127 A | 4/2006 |
| JP | 2008056172 A | 3/2008 |
| JP | 2009202859 A | 9/2009 |
| JP | 2010149644 A | 7/2010 |
| JP | 2012/032860 A1 | 3/2012 |
| SE | 2007/136338 A1 | 11/2007 |
| SE | 2008/123804 A1 | 10/2008 |
| SE | 2011/129747 A1 | 10/2011 |

* cited by examiner

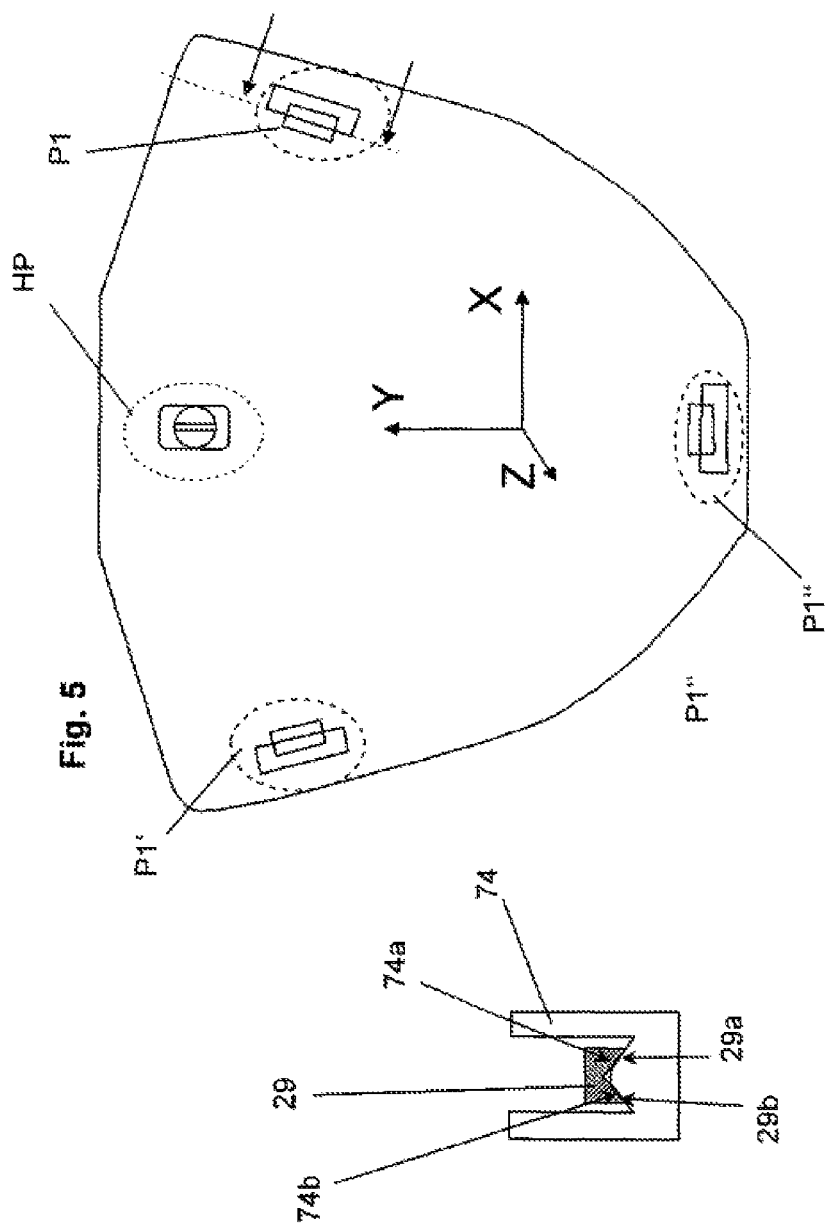

(Prior Art)

STEERING WHEEL UNIT

CROSS REFERENCE TO RELATED APPLICATIONS

This application claims priority to German Patent Application No. 10 2011 118 090.0, filed Nov. 10, 2011; and PCT/EP2012/004624, filed Nov. 7, 2012.

TECHNICAL FIELD OF INVENTION

The invention relates to a steering wheel unit for motor vehicle applications with positioning units for an airbag module mounted on the steering wheel body.

BACKGROUND

In the generic WO 2009/149776 A1 several variants of a steering wheel unit are described with a steering wheel body and an air bag module accommodated in the hub area of the steering wheel body. Several concepts were proposed for positioning the air bag module in the steering wheel body, which all have in common that the axial positioning is effected by means of several positioning units (first positioning units), wherein each positioning unit has a positioning element on the steering wheel side with a rigid, level positioning surface and a positioning element on the airbag module side with a level positioning mating surface parallel to it. The positioning element on the steering wheel side and the positioning element on the air bag module side are made of plastic, in particular thermoplastic. In the normal operating condition of the motor vehicle, the positioning surface and the positioning mating surface are pressed against each other by the horn springs acting in the axial direction.

In the exemplary embodiments of WO 2009/149776 A1 which have advantages because of their ease of assembly and especially because of their problem-free disassembly, additional non-axial positioning units (second positioning units) are provided which act exclusively in the non-axial direction. In this case, the axial positioning units just described also act exclusively in an axial direction. In addition to the many advantages which the generic steering wheel unit exhibits, a disadvantage was also found in the practical tests, namely that it can happen, at least in very unfavorable constellations that the axially acting positioning units are exposed to some wear and tear, wherein the wear and tear can also manifest itself with noise generation. It cannot be ruled out with certainty that this wear and tear, over the operating life, expectancy results in a less accurate Z axis positioning. Although the operating safety of the air bag module or the steering wheel unit is not adversely affected by this, such wear and tear is naturally undesirable.

SUMMARY AND INTRODUCTORY DESCRIPTION OF THE INVENTION

Proceeding from the previously expressed facts, the object of this invention is to further develop a generic steering wheel unit that minimizes both noise and wear and tear.

This object is attained by the steering wheel unit with the features as described herein.

It has been found that the reason for the wear and tear and the noise generation in the generic steering wheel unit with separated axial and non-axial positioning is as follows: in order that the air bag module can be depressed against the force of the horn springs with certainty for activation of the horn, the non-axial positioning units (which comprise a pin on one side and a through-hole on the other side) must have a certain amount of play, even in the rest position, that is, when the air bag module is not depressed. This play can indeed be extremely small, so that it has no influence on the visually perceived positioning accuracy of the air bag module on the steering wheel body, but this freedom of play is enough that the positioning surfaces and the positioning mating surfaces rub against each other during vehicle operation and the ensuing vibrations. This results, on the one hand, in noise generation, and on the other hand in the corresponding wear and tear (since the relevant components, as already mentioned, consist of plastic, and in particular thermoplastic).

A basic feature of the present invention is that the—preferably all—positioning units are designed free of play. This is achieved in that the positioning surfaces and positioning mating surfaces of the first positioning units are not perpendicular to the axial direction—as is the prior art—but are at an angle to it. In other words, the positioning surfaces and positioning mating surfaces are at an angle to a reference plane that is perpendicular to the axial direction. In this description "axial direction" is understood to be the direction in which the horn springs act. One can also include in the definition of axial direction the direction of the steering column as is extends away from the steering wheel body in mounted position.

Thanks to the inventive orientation of the positioning surfaces and the positioning mating surfaces in accordance with this invention, the force acting between a positioning surface and a positioning mating surface has a component which acts in a non-axial direction, even independently of the corresponding friction force. This force component can be used for completely play-free positioning of the air bag module: it is possible, on the one hand, to provide second positioning units (for non-axial positioning), as in the prior art, the play of which can initially be very large, and a direction is predefined for the corresponding elements (especially the trunnion and through-hole), thanks to the previously described non-axial force component, so that the actual play is reduced to zero when the horn is not activated. Another advantage hereby is that the very large play of this second positioning unit can be made available, which becomes "free" when the air bag module is depressed.

In a second embodiment, at least a first positioning unit has two positioning surfaces and two positioning mating surfaces. These two positioning surfaces are not oriented parallel to each other. As a result, the first positioning unit acts both as an axial and as a non-axial positioning unit, making it possible to provide only first positioning units (preferably three).

The air bag module has a center at which typically a gas generator is mounted. The positioning units are located generally and preferably outside the center. Here the non-axial components of the surface normal of the positioning surfaces and the positioning mating surfaces point preferably not in the direction of the center, but in a basically tangential direction in relation to the center.

When assembled, both the module side and the steering wheel side positioning element are rigid, but one of the two positioning elements is preferably designed such it can be elastically deformed during assembly and disassembly. The direction of deformability is thereby preferably perpendicular to the non-axial component of the surface normal of the positioning surface or positioning mating surface. If the positioning surfaces and the positioning mating surfaces are oriented as in the previous paragraph, the direction of deformability is then preferably substantially the radial direction, namely the direction substantially toward or away from the center.

BRIEF DESCRIPTION OF THE DRAWINGS

Preferred embodiments of the invention result from this description as well as from the embodiments depicted more closely with reference to the figures. Shown hereby are:

FIG. 5 shows a second embodiment of the invention in a depiction corresponding to FIG. 1, FIG. 5*a* A is a cross-section along Plane E-E in FIG. 5, FIG. 5*b* shows an alternative to that shown in FIG. 5*a*.

DESCRIPTION OF THE PREFERRED EMBODIMENTS

Figure 9:
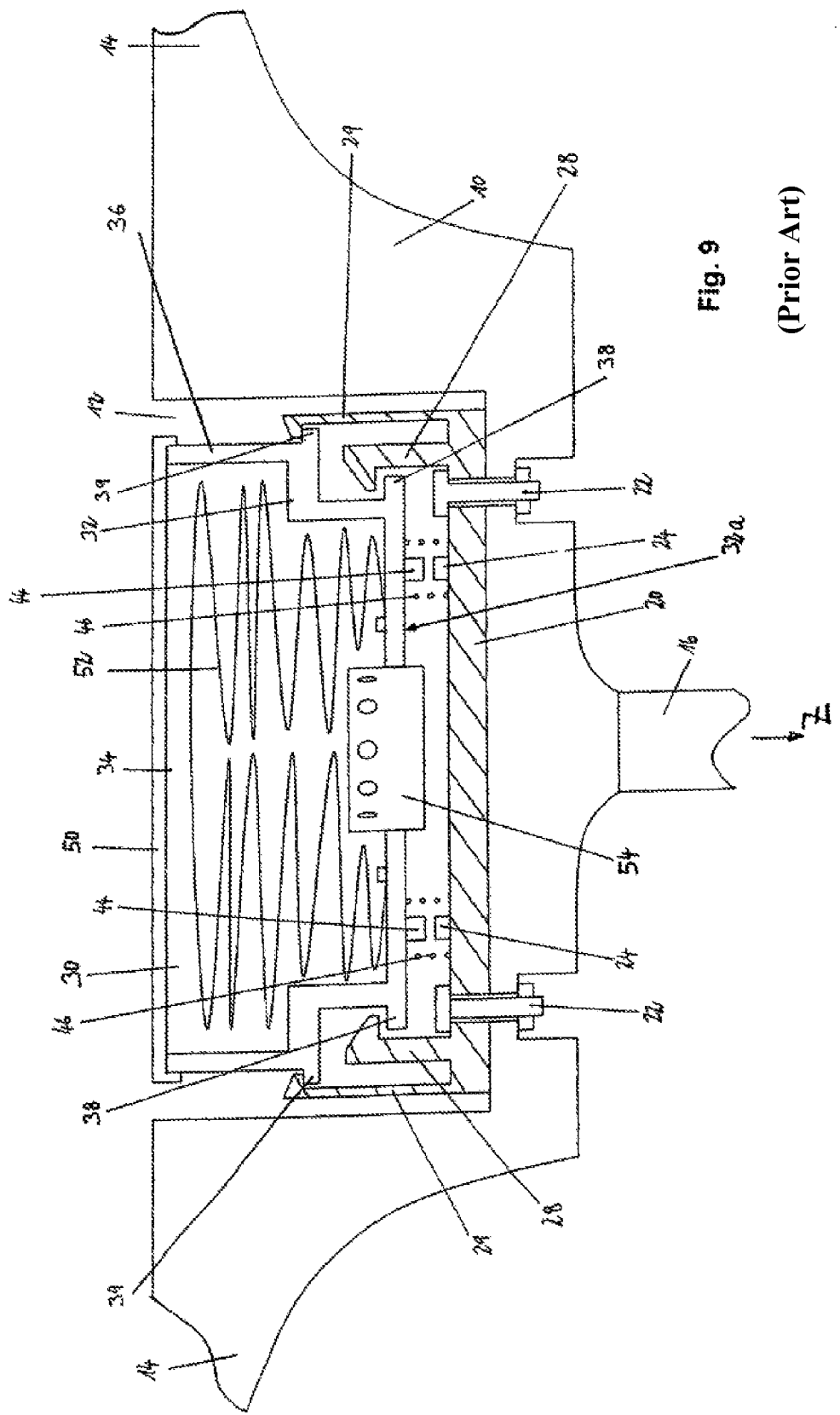
FIG. 9 is a highly schematic cross-section through the hub area of a steering wheel in which an air bag module has been accommodated according to the prior art.
Figure 10:
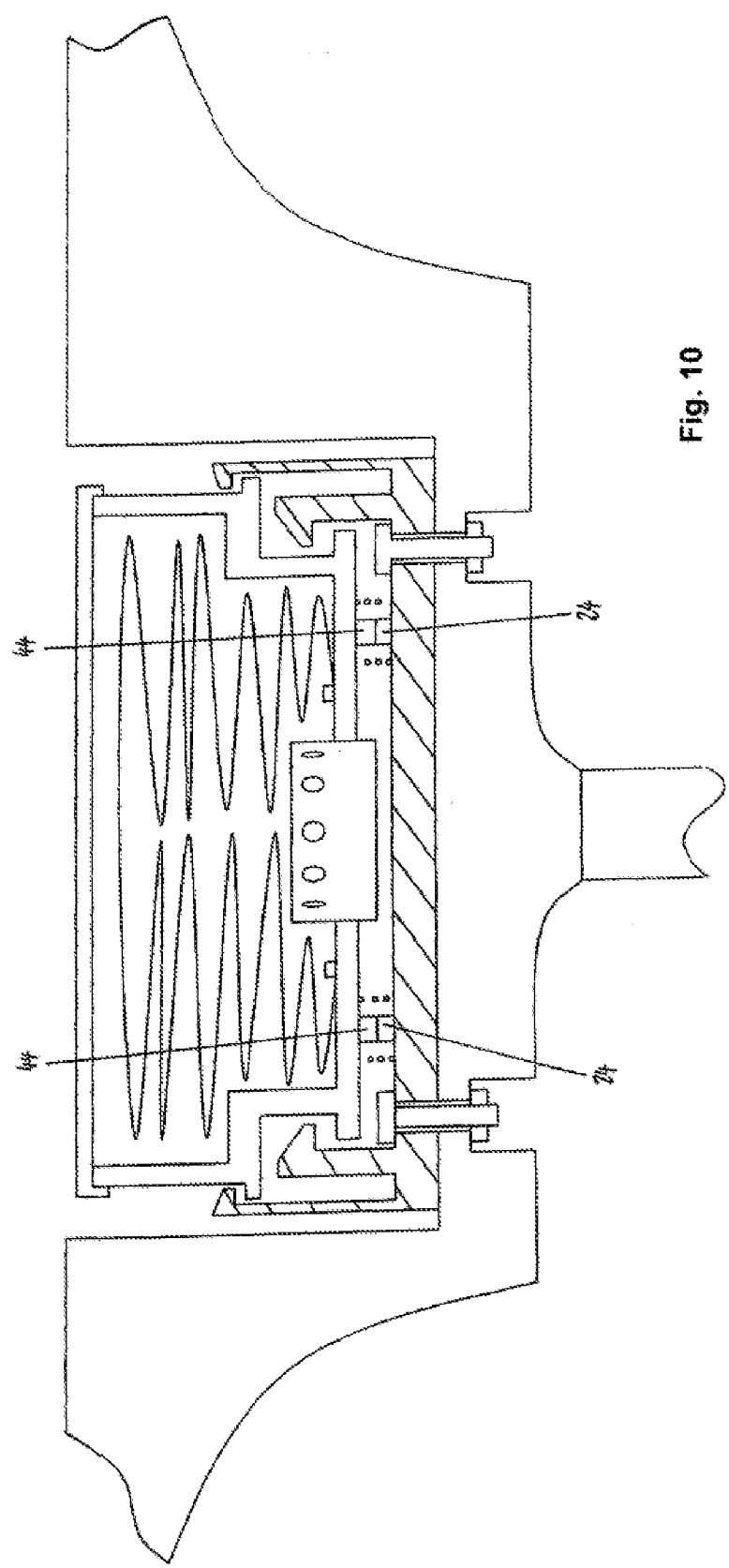
FIG. 10 shows the item shown in FIG. 9 with a depressed air bag module.
Figure 11:
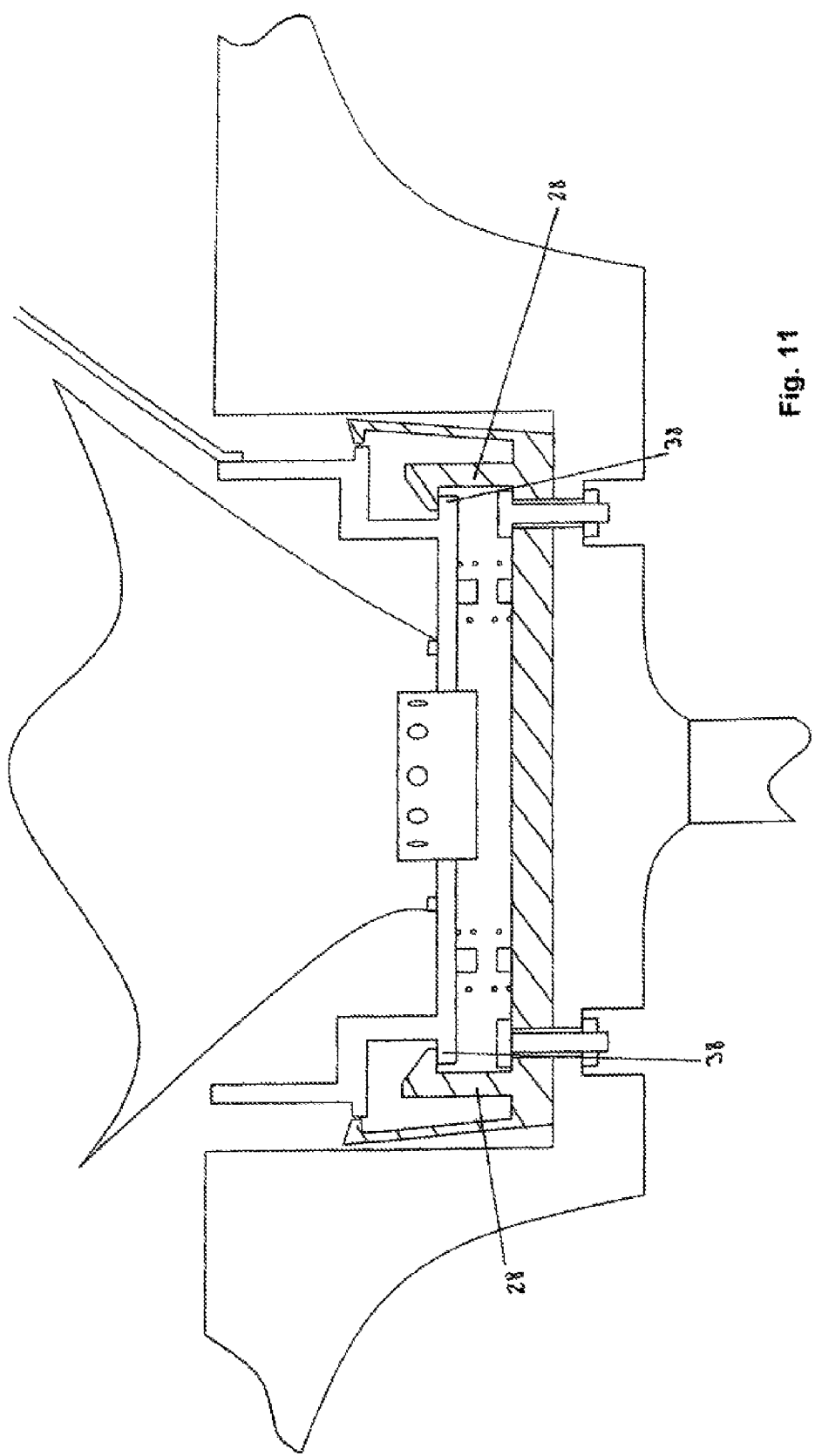
FIG. 11 shows the item shown in FIG. 9 during expansion of the air bag.

For a better understanding of the invention the prior art will again be addressed with reference to FIGS. 9 to 19, as it is described in WO 2009/149776 A1. As will be seen, the basic design of the first embodiment of the invention is very similar to the prior art, so that in the description of the invention reference is accordingly made to the prior art:

The underlying prior art is now described in more detail using the schematic depictions of FIGS. 9 to 11, as well as on the basis of a concrete embodiment. The basic principle is now described referencing FIGS. 9 to 11.

FIG. 9 schematically shows a longitudinal cut through the hub area of a steering wheel unit. This steering wheel unit has a steering wheel with a steering wheel body 10, which has a receptacle 12 in the hub area. Spokes 14 extend from the hub area. The steering column 16 extends centrally from the hub area. The direction of extension of the steering column 16 defines the axial direction or Z-direction in the following description. The plane which is perpendicular to this Z-direction (this plane is also perpendicular to the plane of the drawing of FIG. 1) is the XY plane, which later is also termed the reference plane.

A securing plate 20 is screwed on the base of the receptacle 12 to the steering wheel body 10 by means of screws 22, and thus is rigidly connected. Another possibility is that the securing plate is an integral part of the steering body; this possibility can help to reduce tolerances and production costs. According to definitions selected in this application, the securing plate 20 and all components that extend from it are viewed as belonging to the steering wheel.

An air bag module 30 is accommodated in the receptacle 12. It has a housing 32, an air bag 52 accommodated in the housing 32, and an gas generator 54. A housing cover 50, which also belongs to the air bag module and which is opened in a known manner by the expanding air bag, extends across the exit opening 34 of the housing 32.

The housing base 32*a* of the housing 32 is connected to the securing plate 20 via coil springs 46, so that the air bag module 30, in particular also the housing 32, can be depressed against the force of these coil springs 46 in an axial direction against the steering wheel. If the air bag module 30 is depressed enough, the horn contacts 24 and 44 are closed (see FIG. 10).

The steering wheel, air bag module 30 and the coil springs 46 acting between these component parts together form the steering wheel unit.

The coil springs 46 naturally cannot precisely define the position of the air bag module 30 with respect to the steering wheel, so that positioning units must be provided. Overall the air bag module 30 has 5 degrees of freedom with regard to the steering wheel (three translational degrees of freedom and two rotational degrees of freedom), so that the positioning units must be accordingly designed. If precisely one positioning unit is provided for every possible movement direction, then as a rule 6 positioning units are required. Each positioning unit consists of two parts, namely a steering wheel side element and a module side element. FIG. 9 shows two positioning units which serve for axial positioning, thus positioning in the Z-direction (first positioning units). Each of these axial positioning units features an axial positioning hook 29 as a steering wheel side positioning unit and an axial positioning step 39 as the module side axial positioning element. Only two axial positioning units are shown by the cut-away depictions. In practice, three of these units are present as a rule. The coil springs 46 press the housing 32 upward and thus the axial positioning steps 39 extending from the housing from below against the axial positioning hooks 29, so that as a result the axial position (Z-position) of the module is completely determined. The air bag module 30 can be depressed straight down axially to activate the horn, or it can also be depressed at an angle.

The object of the axial positioning units exclusively for axial positioning; they do not have to receive very large forces. Hence it follows that, among other things, the component parts in question can be made of plastic and in particular the module side axial positioning elements can be made in a single piece with the housing.

Upon activation of the gas generator 54, however, significant forces are developed, also acting in the axial direction. Therefore additional retaining means are present, which hold the air bag module on the steering wheel even if the axial positioning means fail, for example by breaking, because of the high forces that appear (FIG. 11). The retaining means contain steering wheel side retaining means, namely here retaining hooks 28, and module-side retaining means, namely here retaining steps 38. As one can see in FIGS. 9 and 10, the retaining means have no function during a normal operating condition, i.e., when no external force acts on the air bag module (FIG. 9) or when the air bag module is depressed to activate the horn (FIG. 10), i.e., the steering wheel side retaining means (retaining hooks 28) and the module-side retaining means (retaining steps 38) do not touch each other. That is, the retaining means do not act in opposition to the axial positioning means and little is demanded of their dimensional stability. In particular, however, it is also possible to make the retaining means wholly or in part of metal.

Many advantages of the invention may be seen only with reference to a concrete embodiment, which will be described in more detail with respect to FIGS. 12 to 19.

Figure 12:
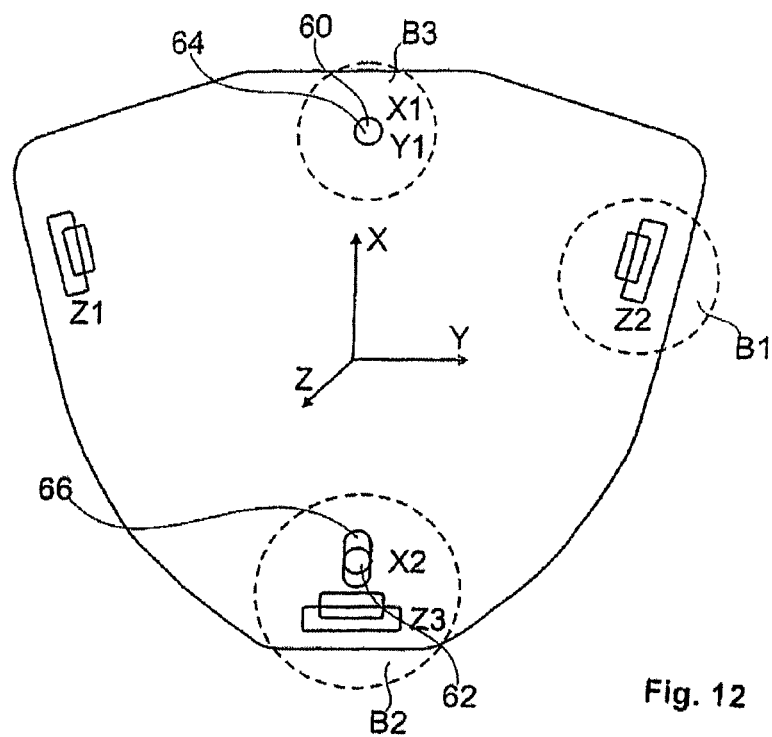
FIG. 12 is an overhead view of an air bag module with a schematic depiction of the positioning means according to the prior art.
Figure 16:
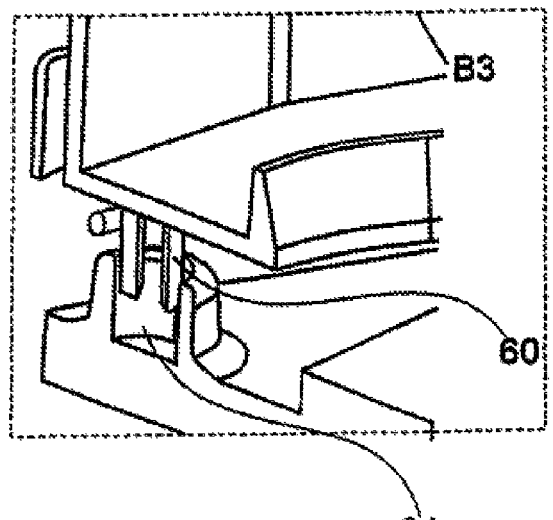
FIG. 16 shows the area B3 from FIG. 12 in a depiction corresponding to FIG. 14.

FIG. 12 shows a schematic overhead view of the prior art air bag module and likewise schematically, the position and function of the individual positioning units. A total of 5 positioning units are present, namely three first positioning units, serving as pure axial positioning units (designated Z1 to Z3), and one XY positioning unit (designated X1Y1), as well as an additional X positioning unit (designated X2), which are the second positioning units. The X positioning unit and the XY positioning unit do not act in an axial direction; they are therefore designated as non-axial positioning units. The axial positioning units (first positioning units) are basically designed as described above with reference to FIG. 9, as shall be seen again later. The two second positioning units X1Y1 and X2 serve to define the position of the air bag module 30 in the XY plane and to prevent rotation in this plane. The X1Y1 positioning unit contains a first positioning trunnion 60 extending in the axial direction as the module side positioning element, and a circular first positioning receptacle 64 as the steering wheel side positioning element (FIG. 16). The X2 positioning unit contains a second positioning trunnion 62 as a module side positioning element, as well as an elongated second positioning receptacle 66 as the steering wheel side positioning element. The elongated design of the second positioning receptacle 66 serves to compensate for length changes induced by shrinkage or temperature change.

Figure 13:
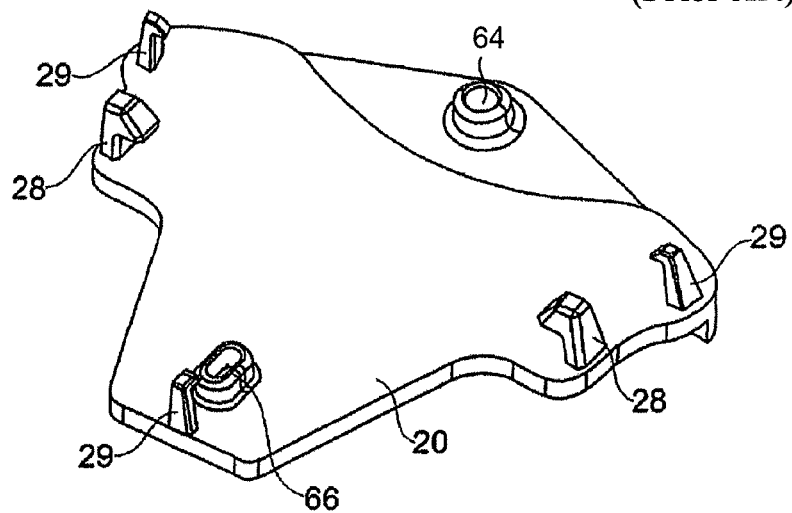
FIG. 13 shows a securing plate according to the prior art.
Figure 14:
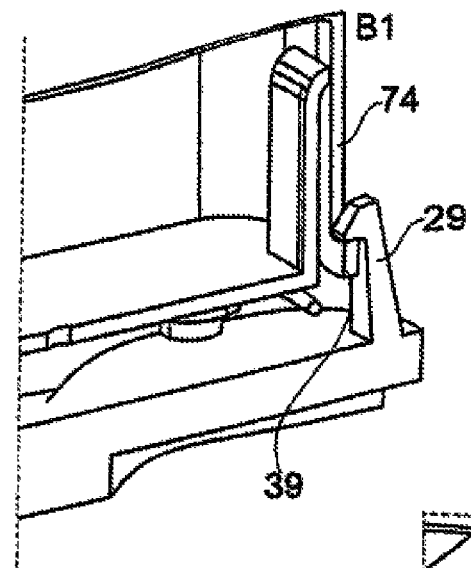
FIG. 14 shows the area B1 from FIG. 12 in a detailed 3-dimensional view, when the housing is held on the securing plate.
Figure 15:
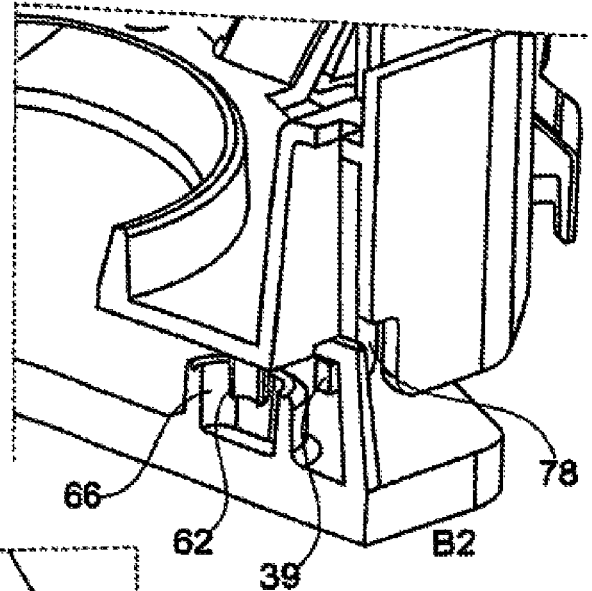
FIG. 15 shows the area B2 from FIG. 12 in a depiction corresponding to FIG. 14.

FIG. 13 shows the securing plate 20 of the first embodiment. The three axial positioning hooks 29, which serve as steering wheel side axial positioning elements, two retaining hooks 28, which serve as steering wheel side retaining means, as well as the two positioning receptacles 64 and 66 can be discerned. The axial positioning hooks and retaining hooks are all in a rigid design. FIGS. 14-16 show how the steering wheel side positioning elements interact with the module side positioning elements. The module-side axial positioning elements are also axial positioning steps 39 here, which here are the underside (positioning surfaces 64*a*) here of the U-bolts 74, 74', and 74" (see FIGS. 14, 17-19).

Figure 17:
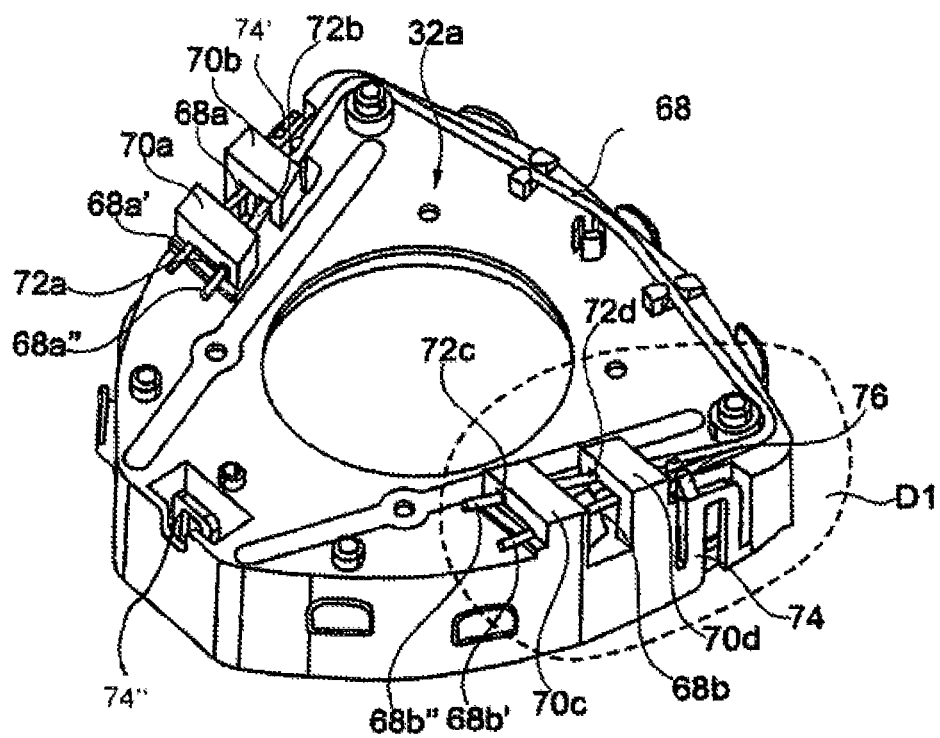
FIG. 17 shows the housing of the air bag module in a 3-dimensional depiction from below, wherein an omega-spring is fastened to the housing base and wherein two positions of the omega-spring are shown.
Figure 18:
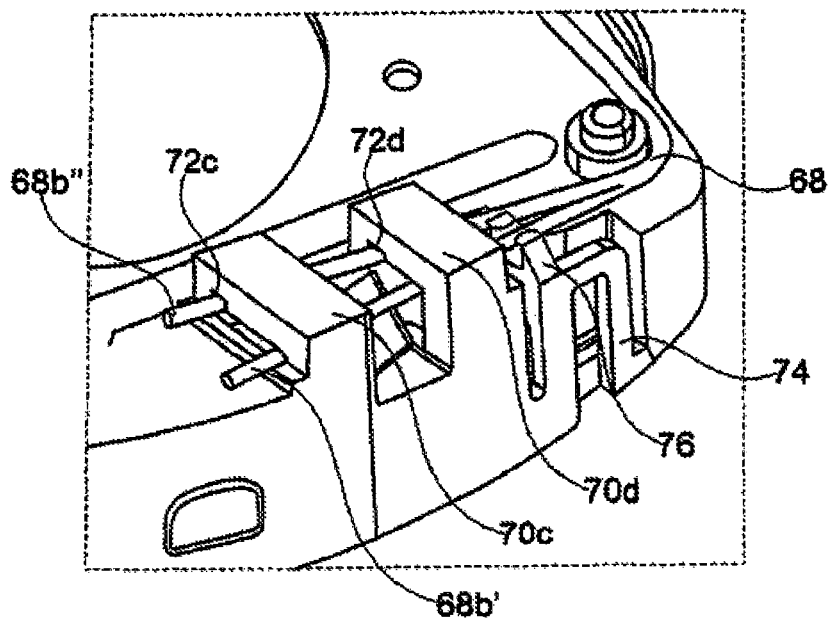
FIG. 18 shows the detail D1 from FIG. 17.
Figure 19:
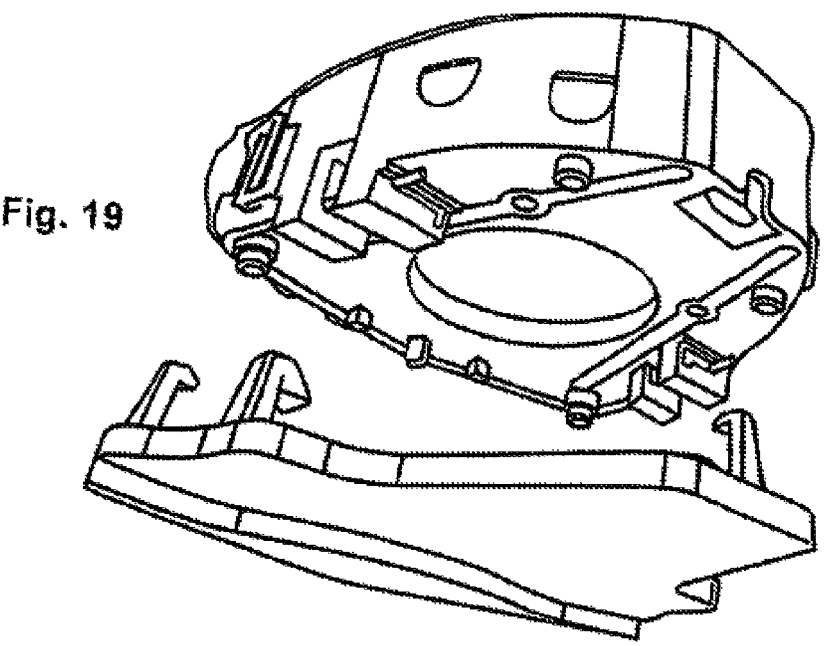
FIG. 19 shows the housing of FIG. 17 and the securing plate from FIG. 13.

The matter of how the module side retaining means is constructed will now be described with reference to FIGS. 17 and 18. A spring wire is held on the housing base 32*a* and is designated as an omega spring 68 because of its shape. The end sections 68*a* and 68*b* of this omega spring 68 are held respectively by two retainer blocks 70*a* to 70*d*, wherein each of these retainer blocks 70*a* to 70*d* has a groove 72*a* to 72*d*. This groove is located on the inside, so that the end sections 68*a*, 68*b* of the omega spring 68 can assume two positions, namely an outer one 68*a*', 68*b*' which corresponds to the locked state, and an inner one 68*a*" and 68*b*", which corresponds to the unlocked state, as shown in FIG. 17.

Directly behind the retainer blocks 70*b*, 70*d* each omega spring 68 is guided through a U-shaped translator 76; these extend from a U-bolt 74, 74'. The result of this is that, when an end section of the omega spring is swiveled from the outer to the inner position, the affected axial positioning step of the corresponding first U-bolt 74, 74' is also swiveled inward. The translator 76 is constructed in a single piece with the U-bolt 74, which in turn is in a single piece with the housing 32. The housing 32 is an injection molded part of plastic or has a metal core coated with plastic.

During assembly of the air bag module, it is guided from above into the receptacle of the steering wheel body (FIG. 19), the end sections of the omega spring 68 being located in their outer position. These are thereby pressed somewhat inward by the angled heads of the retainer hooks 28, but not so much that they snap into the grooves 72*a* to 72*d* of the retainer blocks 70. That is, after completion of the assembly they snap back again into the outer position. In similar manner, the axial positioning steps 39 of the U-bolts 74, 74' are also slightly pressed in by the likewise angled heads of the axial positioning hooks 29 and after completion of the assembly snap back into their load-free initial position. In the assembled position when the horn is not depressed, the axial positioning hooks 29 rest on the axial positioning steps 39 (which are parts of the U-bolts), while the retainer hooks and the end sections of the omega springs 68 (which form the module side retainer means) do not touch. That means that the axial position (Z-position) of the module is exclusively determined by the axial positioning hooks and the axial positioning steps. During activation of the gas generator 54 and appearance of the ensuing forces, the axial positioning hooks and/or the U-bolts 74, 74', and 74" may break. In this case the retainer hooks 28 together with the omega spring 68 prevent the air bag from separating from the steering wheel.

If the air bag module 30 has to be disassembled from the steering wheel, the end sections of the omega spring 68 are brought into the inner position from the outside using a tool, so that they snap into the grooves 72. In this position they rest so far inward, that they can no longer engage the retainer hooks 28 (unlocked position). During this movement the end sections of the omega spring 68 as well as the axial positioning steps 39 of the U-bolts 74, 74' swivel inward (the translators 76 serving this purpose). In this position, the corresponding axial positioning steps 39 also rest so far inward that they no longer can come in contact with the axial positioning hooks 29 (unlocked position), so that the air bag module 30 can be lifted upward. Since the U-bolt 74" is not swiveled into a disassembly position, a slight tipping of the air bag module is necessary when lifting it out. The elongated shape of the second positioning receptacle 66 makes this tipping possible. The elongated shape of this second positioning receptacle 66 thus has two purposes: it serves to compensate for length changes which are caused by temperature changes or shrinkage and to facilitate the tipping which is needed during disassembly.

FIGS. 1, 1a, 1b and 1c show only the inventive improvement in a first embodiment. The basic design is identical to that just described, so that reference is made thereto. The difference lies in the design of the positioning units, namely both the first and the second.

Next, the first positioning units P1, P1', and P1" will be addressed. It is evident that both the positioning surfaces 29a, 29b, and 29a" of the axial positioning hooks 29, 29', and 29" serving as the steering wheel side positioning elements, as well as the respective associated positioning mating surfaces 74a, 74a', and 74a" of the U-bolts 74, 74', and 74" are angled to the same extent to a reference plane BE (FIG. 1c) which is perpendicular to the axial direction, so that each positioning surface abuts the positioning mating surface associated with it. It is important to note, that the U-bolts 74, 74', and 74", which serve as the air bag module side positioning elements, and the axial positioning hooks 29, 29', and 29", which serve as the steering wheel side positioning elements, touch exclusively across their positioning surfaces and positioning mating surfaces. In other words: the inner width b1 of the U-bolt is greater than the width b2 of the positioning hook. The orientation of the positioning surfaces of the first two positioning hooks hereby is approximately in the same direction, thus producing a first non-axial force component K1. The orientation of positioning surface 29a" and positioning mating surface 74a" from the third axial positioning hook with respect to the third U-bolt results in a second non-axial force component K2.

Figure 1:
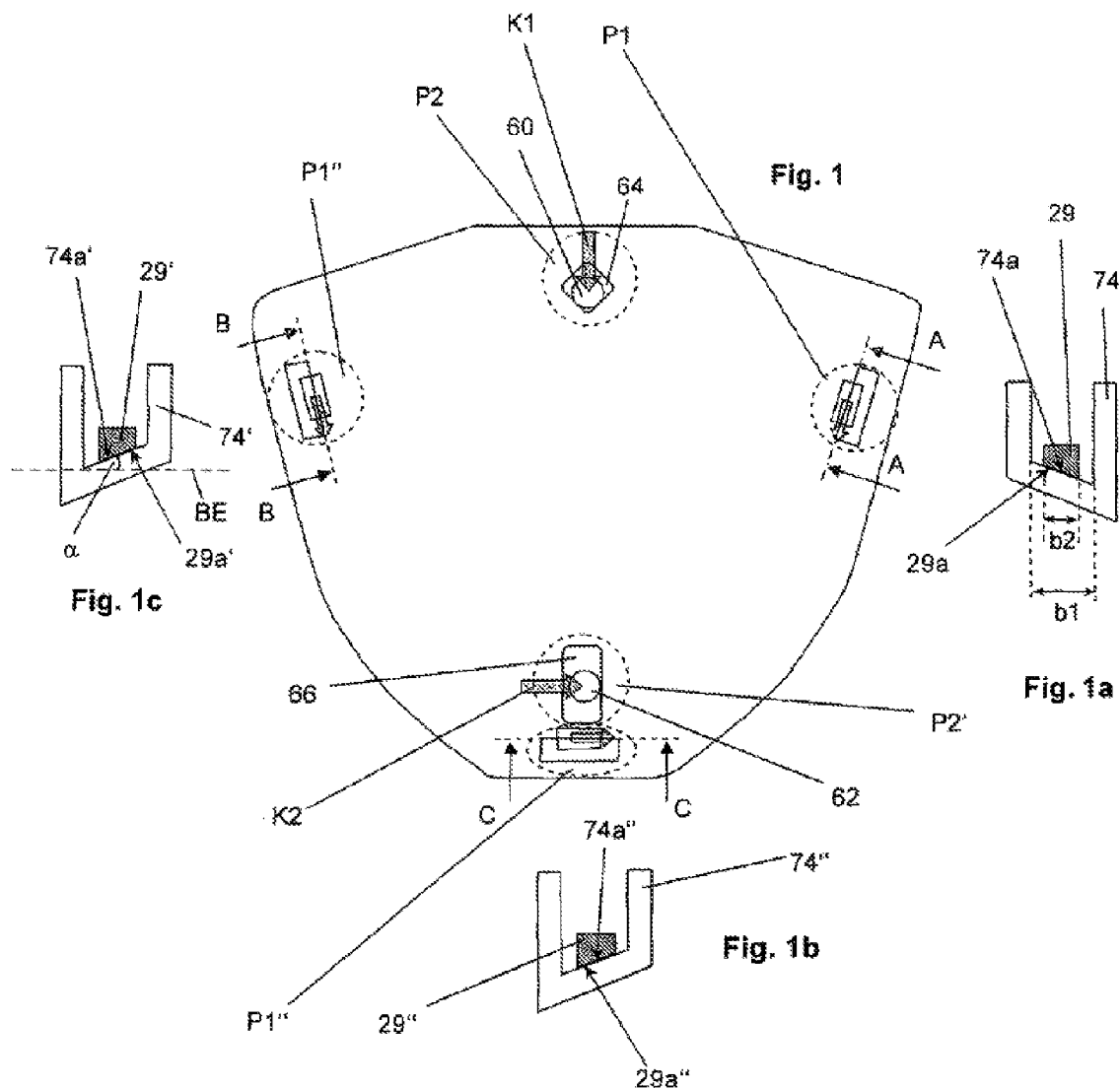
FIG. 1 shows an overhead view of an air bag module with schematic positioning units, FIG. 1*a* A cross-section along the Plane A-A in FIG. 1, FIG. 1*b* A is a cross-section along the Plane B-B in FIG. 1, FIG. 1*c* A is a cross-section along the Plane C-C in FIG. 1.

As can be seen in FIG. 1, the dimensions of the positioning receptacles 64, 66 are substantially greater than the dimensions of the positioning trunnions 60, 62 associated with them. However, the positioning trunnions 60, 64 are pressed in a defined manner by the just mentioned force components against the side walls 36 of their associated positioning receptacle 64, 66, whereby exact non-axial positioning is achieved by the second positioning devices P2, P2'. This positioning again reacts back on the positioning between the axial positioning hooks and the U-bolts. Thus a condition is created in which the air bag module is not depressed, namely a complete absence of play, which leads to the desired result. It is also evident that there is an interplay between the first positioning units P1, P1', and P1" and the second positioning units P2, P2'. When the air bag module is depressed, the absence of play is eliminated, so that there is no danger of sticking, and the horn can be very easily activated.

As previously described with reference to the prior art, the U-bolts (at least the first and the second U-bolts 74, 74') can be deformed elastically in the radial direction, so that simple assembly and disassembly is retained. The non-axial components of the surface normal point in approximately a tangential direction and perpendicularly to the radial direction. That is, the direction of the elastic deformation and the non-axial components of the surface normals are basically perpendicular to each other. A further result is that the positioning surfaces and positioning mating surfaces in assembled state are rigid with respect to the steering wheel body and the air bag module. They exert no force, which is attributable to the elastic features of the U-bolt in the radial direction. The force producers are exclusively the horn springs (coil springs 46).

Figure 2:
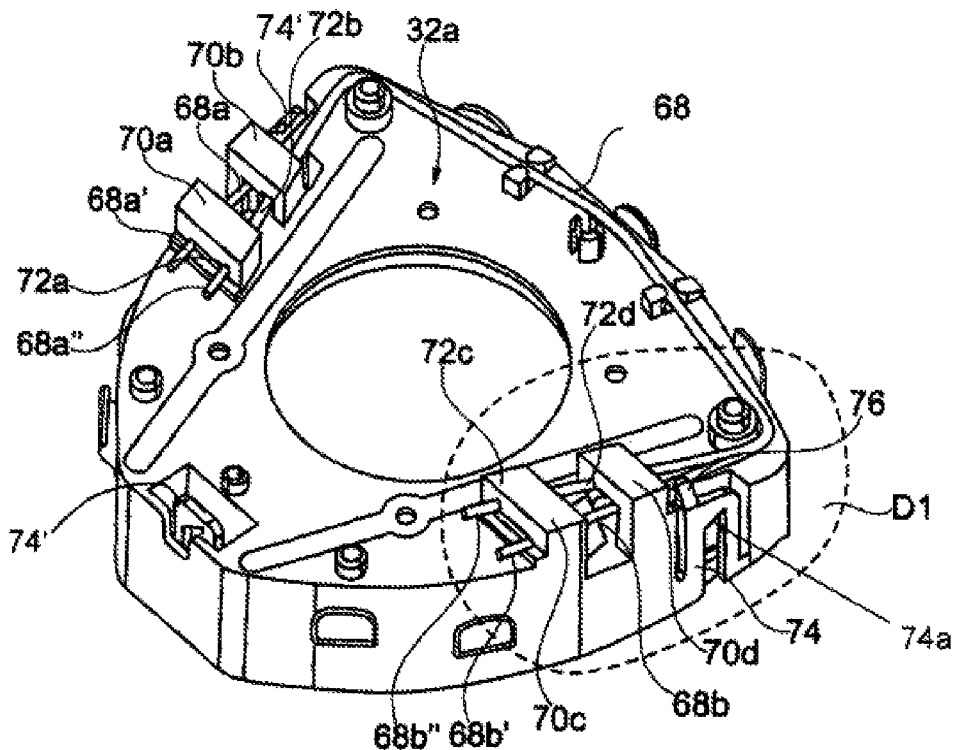
FIG. 2 shows the housing of the air bag module in a 3-dimensional depiction from below.
Figure 3:
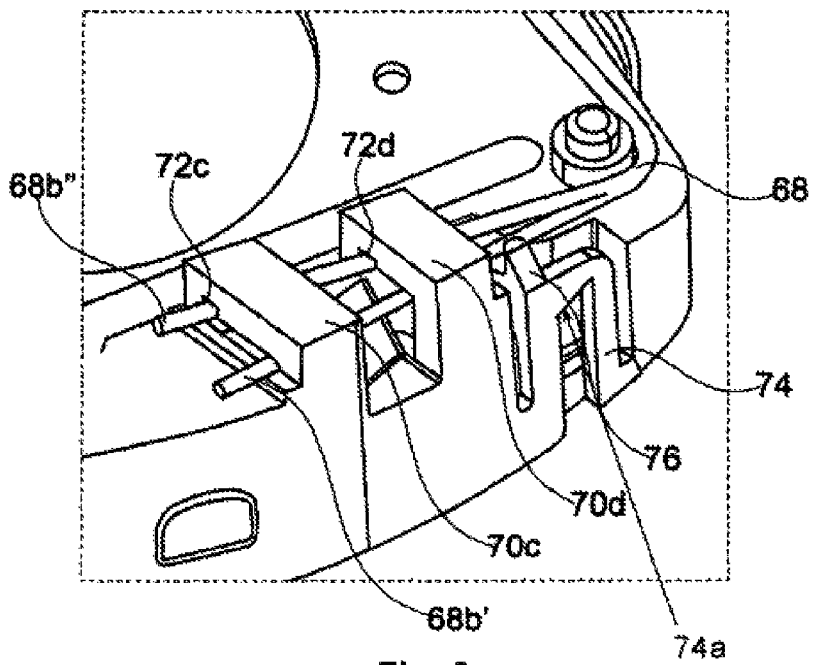
FIG. 3 shows the detail D1 from FIG. 2.

FIGS. 2 and 3 again show the orientation of the positioning surfaces in a depiction according to FIGS. 1, 1a, 1b, and 1c.

Figure 4:
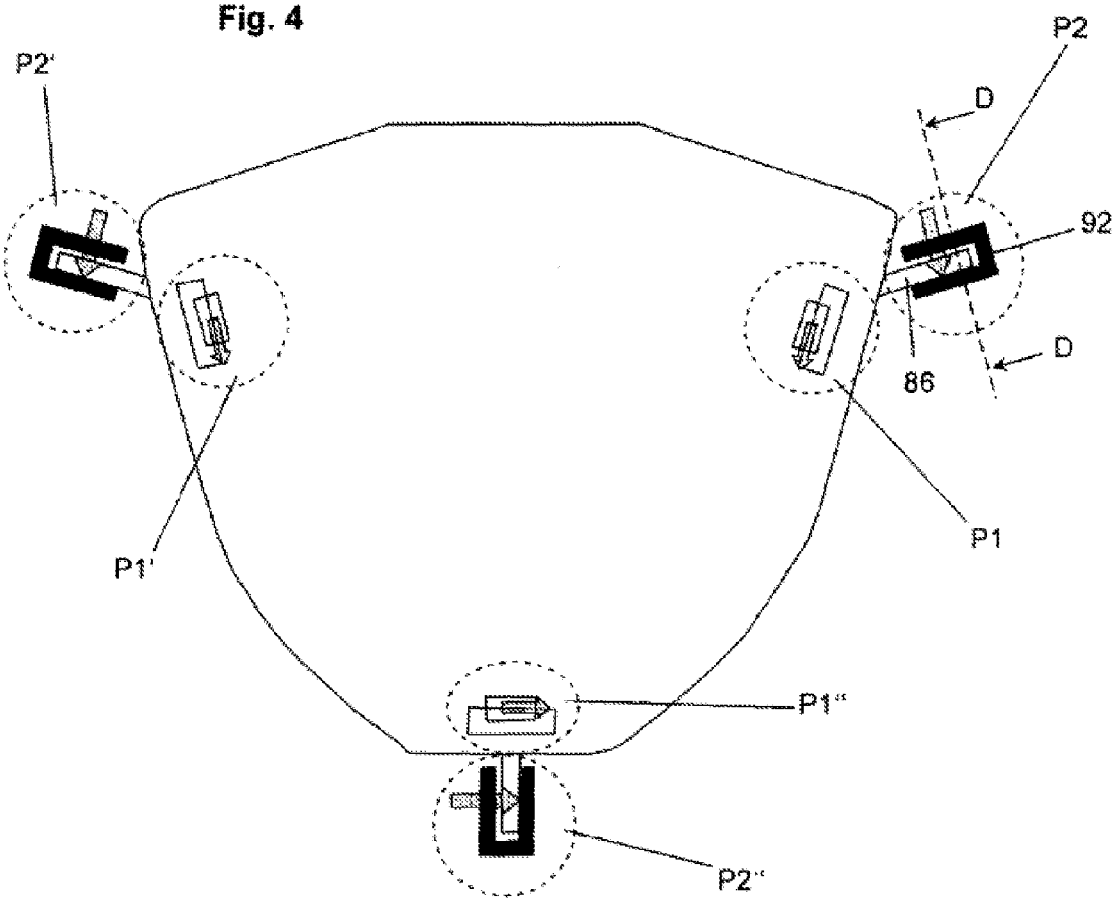
FIG. 4 shows an alternative embodiment to that shown in FIG. 1, FIG. 4*a* A shows a cross-section along Plane D-D in FIG. 4.
Figure 4A:
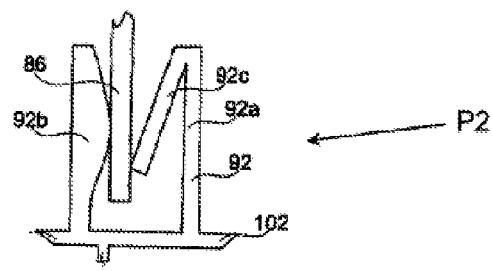

FIGS. 4 and 4a show a variant of what was just described. The first positioning units P1, P1', and P1" are designed identically to what was just described, so that this does not have to be covered again. The second positioning units P2, P2', and P2" are designed as outside positioning units, as also was described in the generic document, to which reference is hereby explicitly made. The module side positioning elements here are plate-shaped sections 86; the steering wheel side positioning elements are designed as receptacle elements 92 with a first leg 92a, a second leg 92b, and an elastic arm 92c. These receptacle elements, which are all designed identically, are accommodated in the foam of the steering wheel body. As can be directly seen from FIGS. 4 and 4a, the particular plate-shaped section 86 is pressed on the particular second leg 92b, which is effected by the above described non-axial forces produced by the first positioning units P1, P1', and P1" as well as by the elastic arms 92c. It is also basically possible to eliminate the plastic arms. In the first embodiment shown, each first positioning unit is exactly associated with a second positioning unit. Here, too, there is good assembly and disassembly capability.

FIGS. 5 and 5a show a second embodiment of the invention. With this embodiment, it is especially possible to provide only first positioning units P1, P1', and P1", wherein each first positioning unit has two positioning surfaces 29a, 29b and two positioning mating surfaces 74a, 74b. Both positioning surfaces and positioning mating surfaces are angled with respect to the above defined reference plane. However, the positioning surfaces of a first positioning unit are not parallel to each other, but preferably mirror-symmetrical. Here too the module-side positioning elements and the steering wheel side positioning elements touch each other exclusively across the positioning surfaces and positioning mating surfaces. In particular, the module-side positioning elements and the steering wheel side positioning elements do not touch in the bend area between the two positioning surfaces. This results in positioning both in the axial and in the non-axial direction by means of three such positioning units, wherein the positioning is free of play with a non-depressed air bag module, just as in the first embodiment, but when the air bag module is depressed, the corresponding play does arise. Accordingly, here too the width of the hooks is smaller than the free interior diameter of the U-bolt. For easier assembly, a slit trunnion can also be provided which protrudes into a corresponding positioning receptacle, resulting in an auxiliary positioning unit HP. This is not necessary for functioning, however, but rather is solely for facilitating assembly, if necessary. The actual positioning is handled by the three first positioning units P1, P1', and P1". Here, too, at least one part of the U-bolt can deform elastically, preferably in the radial direction, as described above. All three first positioning units can be designed identically.

FIG. 5b shows an alternative first positioning unit in which surfaces 29a and 29b form an obtuse release angle in a depiction corresponding to FIG. 5a in which surfaces 29a and 29b form an acute release angle.

Figure 6:
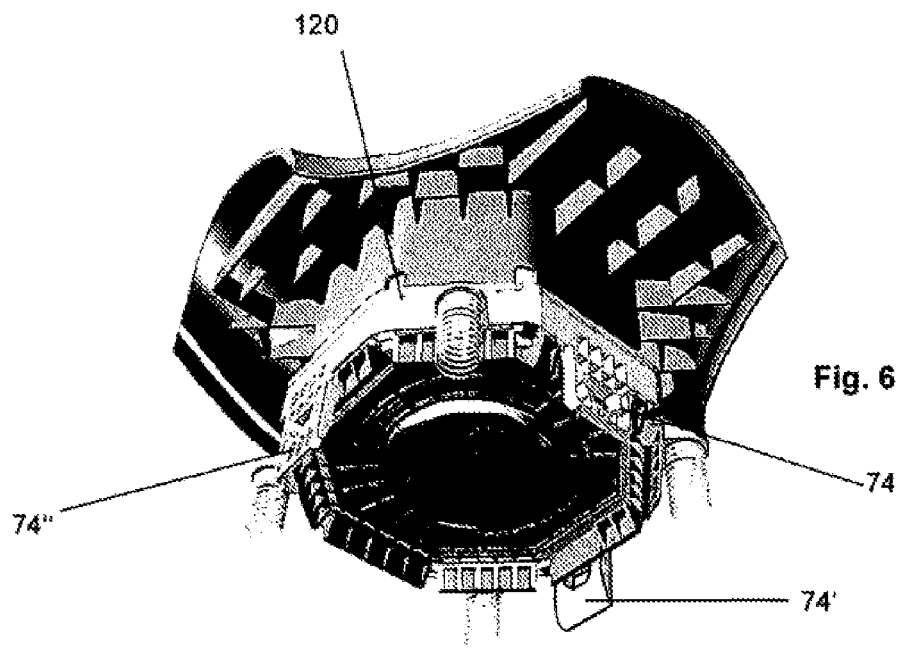
FIG. 6 is a perspective view from below of an air bag module of a second embodiment corresponding to a second variant of the invention.
Figure 7:
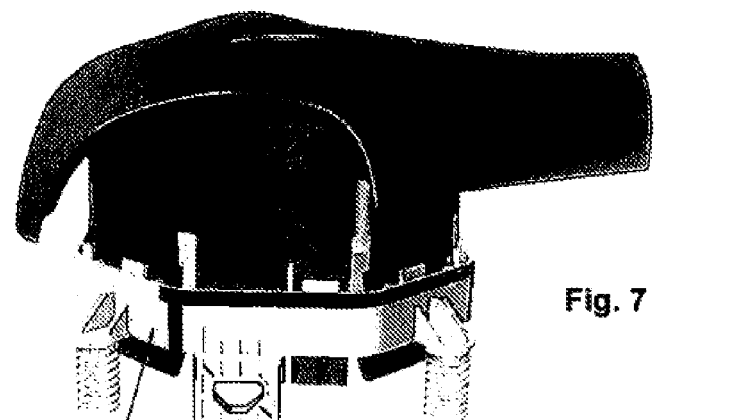
FIG. 7 shows the air bag module from FIG. 6 in a second view.
Figure 8:
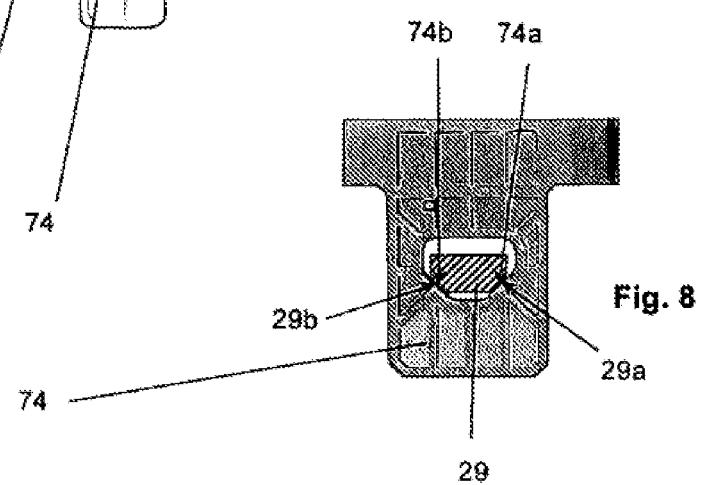
FIG. 8 shows a securing bracket which is latched on an engagement hook.

FIGS. 6 to 8 show a second embodiment of the previously described second design. Here the module side positioning elements are part of a ring 120 which encloses an essentially one-piece air bag module as described, for example, in DE 10 2010 006 358 A1. The manner of functioning of the first positioning units is identical to that just described, in particular the U-bolts 74, 74', and 74" (which one could also designate as brackets here) can elastically deform, for example, in the radial direction for the purpose of assembly or disassembly. Here, too, the U-bolts 74, 74' and 74"

(module side positioning elements) and the axial positioning hooks 29 (steering wheel side positioning elements) touch solely across the positioning surfaces and the positioning mating surfaces. In particular the module-side positioning elements and the steering wheel side positioning elements do not touch in the intermediate area between the two positioning surfaces.

In contrast to the other embodiments depicted, the first positioning units here serve for assured retention of the air bag module during expansion of the air bag; thus no special retaining means are provided. Accordingly the component parts of the first positioning units are designed to be mechanically stable.

While the above description constitutes the preferred embodiment of the present invention, it will be appreciated that the invention is susceptible to modification, variation and change without departing from the proper scope and fair meaning of the accompanying claims.

The invention claimed is:

1. A steering wheel unit comprising:
a steering wheel body and an air bag module positioned on the steering wheel body and configured to be depressed in an axial direction against the steering wheel body, whereby a spring element acting in the axial direction is positioned between the steering wheel body and the air bag module wherein the spring element acts against both a steering wheel body surface and an airbag module surface, at least one positioning unit to position the air bag module on the steering wheel body, including a steering wheel side positioning element formed by the steering wheel body with at least one first rigid positioning surface, and an air bag module side positioning element formed by the airbag module with at least a rigid second positioning surface, wherein the first and the second positioning surfaces are parallel to each other with a non-depressed air bag module and abut one other at an abutting interface under the force of the spring element, and
the first and the second positioning surfaces are each angled with respect to a reference plane which is perpendicular to the axial direction;
wherein the abutting interface is disposed at an axial position relative to the steering wheel body surface against which the spring acts, and the spring element is disposed axially between the steering wheel body surface and the abutting interface.

2. The steering wheel unit according to claim 1 further comprising in that the steering wheel side positioning element and the air bag module side positioning element are in mechanical contact with each other solely via the first and second positioning surfaces.

3. The steering wheel unit according to claim 1 further comprising in that the steering wheel side positioning element or the air bag module side positioning element is elastically deformable for the purpose of assembly or disassembly in a radial direction which is generally perpendicular to a non-axial component of the first and second positioning surfaces.

4. The steering wheel unit according to claim 1 further comprising in that the angle between the positioning surfaces and the reference plane is between 10° and 50°.

5. The steering wheel unit according to claim 1 further comprising in that three of the positioning units are provided.

6. The steering wheel unit according to claim 1 wherein the positioning unit includes first positioning units and further comprising at least one second positioning unit acting solely in a non-axial direction with at least one non-axial positioning surface rigid with respect to the steering wheel body and at least one non-axial positioning mating surface rigid with respect to the air bag module, wherein the non-axial positioning surface and non-axial positioning mating surface abut one other with a non-depressed air bag module.

7. The steering wheel unit according to claim 6, further comprising in that the non-axial positioning surface and the non-axial positioning mating surface are pressed together due to at least one of the first positioning units.

8. The steering wheel unit according to claim 6 further comprising in that at least one first positioning unit and at least one second positioning unit are arranged at a distance from one other.

9. The steering wheel unit according to claim 6 further comprising in that the second positioning unit has one trunnion extending in the axial direction and a receptacle into which the trunnion extends.

10. The steering wheel unit according to claim 9, further comprising in that the inner diameter of the receptacle is greater than the outer diameter of the trunnion, wherein the trunnion is spaced away from an inner perimeter of the receptacle on all sides of the trunnion when the trunnion is centered within the receptacle, and wherein the trunnion will move within the receptacle and be pressed against a wall of the receptacle in response to non-axial forces caused by the first positioning unit when the airbag module is not axially depressed.

11. The steering wheel unit according to claim 1 further comprising in that the angle between the positioning surfaces and the reference plane is about 30°.

12. The steering wheel unit according to claim 1 wherein the positioning units include first positioning units and the steering wheel unit further comprises at least one secondary positioning unit having a first secondary rigid positioning surface and a second secondary rigid positioning surface and wherein the rigid positioning surfaces of the first positioning unit and the secondary rigid positioning surfaces of the second positioning unit provide nonaxial forces which are opposing.

13. A steering wheel unit comprising:
a steering wheel body and an air bag module positioned on the steering wheel body and configured to be depressed in an axial direction against the steering wheel body, whereby a spring element acting in the axial direction is positioned between the steering wheel body and the air bag module, at least one positioning unit to position the air bag module on the steering wheel body, including a steering wheel side positioning element formed by the steering wheel body with at least one first rigid positioning surface, and an air bag module side positioning element formed by the airbag module with at least a rigid second positioning surface, wherein the first and the second positioning surfaces are parallel to each other with a non-depressed air bag module and abut one other under the force of the spring element, and
the first and the second positioning surfaces are each angled with respect to a reference plane which is perpendicular to the axial direction;
wherein one of the steering wheel side and the air bag module side positioning element is constructed as a closed yoke or a closed bracket into which the other of the steering wheel side and the airbag module side positioning element protrudes.

14. A steering wheel unit comprising:
a steering wheel body and an air bag module positioned on the steering wheel body and configured to be depressed in an axial direction against the steering wheel body, whereby a spring element acting in the axial direction is positioned between the steering wheel body and the air bag module, at least one positioning unit to position the air bag module on the steering wheel body, including a steering wheel side positioning element formed by the steering wheel body with at least one first rigid positioning surface, and an air bag module side positioning element formed by the airbag module with at least a rigid second positioning surface, wherein the first and the second positioning surfaces are parallel to each other with a non-depressed air bag module and abut one other under the force of the spring element, and
the first and the second positioning surfaces are each angled with respect to a reference plane which is perpendicular to the axial direction;
wherein the at least one positioning element having two of the first positioning surfaces and two of the second positioning, wherein the two first positioning surfaces are not parallel to each other and the two second positioning surfaces are not parallel to each other.

15. The steering wheel unit according to claim 14 wherein the two of the first positioning surfaces or the two of the second positioning surfaces are formed by a yoke and form a relative obtuse angle.

16. The steering wheel unit according to claim 14 wherein the two of the first positioning surfaces or the two of the second positioning surfaces are formed by a yoke and form a relative acute angle.

17. A steering wheel unit comprising:
a steering wheel body and an air bag module positioned on the steering wheel body and configured to be depressed in an axial direction against the steering wheel body, whereby a spring element acting in the axial direction is positioned between the steering wheel body and the air bag module, at least one positioning unit to position the air bag module on the steering wheel body, including a steering wheel side positioning element formed by the steering wheel body with at least one first rigid positioning surface, and an air bag module side positioning element formed by the airbag module with at least a rigid second positioning surface, wherein the first and the second positioning surfaces are parallel to each other with a non-depressed air bag module and abut one other under the force of the spring element, and
the first and the second positioning surfaces are each angled with respect to a reference plane which is perpendicular to the axial direction
wherein the at least one first positioning unit also serves as a retainer for the air bag module on the steering wheel body and also holds the air bag module on the steering wheel body during expansion of an air bag of the air bag module.

18. The steering wheel unit according to claim 17 wherein further comprising in that in addition to the at least one first positioning unit, retaining means is present which has no function during normal operation of the steering wheel unit but holds the air bag module on the steering wheel body in the event the positioning unit fails during expansion of an air bag of the air bag module.

* * * * *